April 28, 1964 W. NICLAS 3,130,965
AIR SUSPENSION SYSTEMS
Filed Feb. 16, 1956
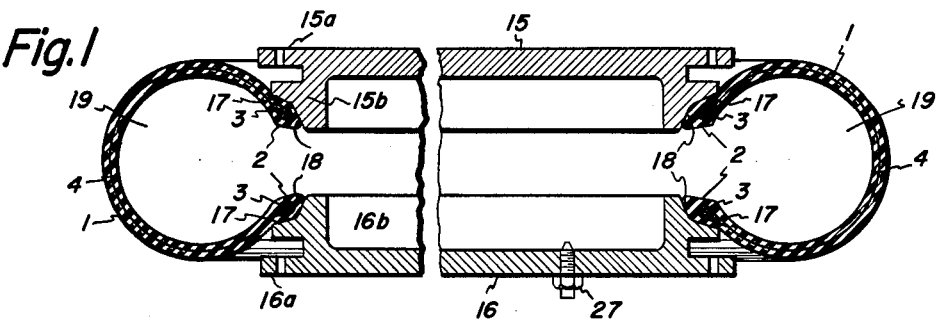
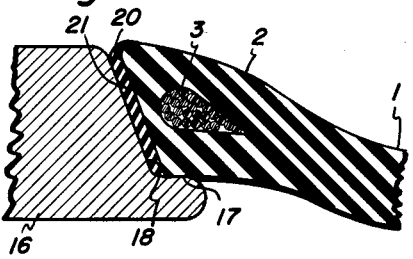
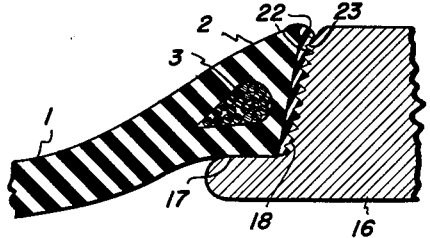
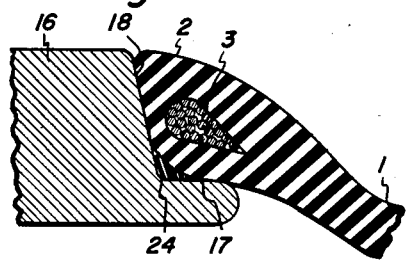
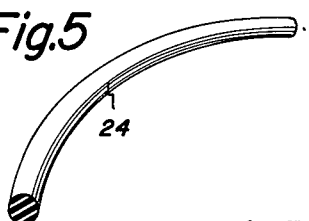
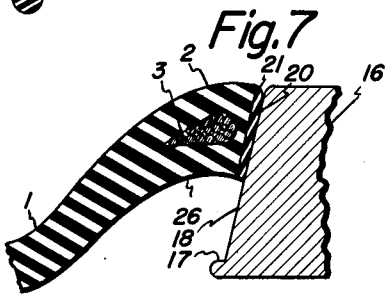
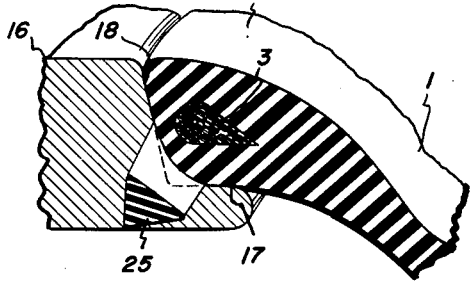
INVENTOR.
WALTER NICLAS
BY
Attorneys

United States Patent Office 3,130,965
Patented Apr. 28, 1964

3,130,965
AIR SUSPENSION SYSTEMS
Walter Niclas, Hannover, Germany, assignor to Continental Gummi-Werke A.G., Hannover, Germany, a corporation of Germany
Filed Feb. 16, 1956, Ser. No. 566,017
Claims priority, application Germany Feb. 16, 1955
8 Claims. (Cl. 267—65)

This invention relates to improvements in air suspension systems which comprise a torus-shaped hollow body made of rubber or the like resilient material which is particularly suitable for vehicles. The invention relates more particularly to air suspension systems which comprise torus-shaped hollow bodies possessing strengthened rims or beads along their inner openings as well as reinforcing elements embedded in the material, which reinforcing elements are anchored at the beads of the hollow bodies.

The invention relates further to an improved method of sealing hermetically the interior of the aforesaid torus-shaped hollow bodies against loss of fluid from its interior under the pressure of two bodies, for instance, parts of a vehicle, between which the torus-shaped hollow body is mounted. The invention finally relates to improved sealing means for carrying out the aforesaid method in practice.

It is an object of the invention to provide a simplified method and means for sealing torus-shaped hollow bodies which consist essentially of rubber or the like elastic material against the loss of fluid from their interior when these elastic bodies are used in air suspension systems, for instance, for vehicles.

It is well known in the art to adapt hollow bodies consisting of rubber or similar material for air cushioning by providing them with thickened beads along their edges and to fasten and hermetically seal these hollow bodies between two bodies to be cushioned against each other by mechanical means for connecting each of these bodies to be cushioned to the hollow body of rubber or the like material. These mechanical means comprise, for instance, clamping means which seize the beads of the hollow body. It has also been suggested to eliminate mechanical means for fastening the hollow body along its beads and to provide, instead, additional elastic air vessels or tubes inside the hollow body, which vessels or tubes are properly the cushioning medium.

The known methods and means for sealing hollow bodies used as cushioning devices against loss of cushioning media are relatively complicated and have correspondingly a relatively short life.

The above object is attained and a substantial simplification in the known air suspension systems, in particular, is achieved by my invention which provides for the hermetic sealing of the pressure space formed inside torus-shaped hollow bodies, which sealing is effected by the excess pressure generated in the interior of the hollow body, which excess pressure urges the beads of the hollow body against the seating surfaces provided on each of the bodies to be cushioned against each other. This new means of sealing hollow bodies for air suspension purposes, I succeed in eliminating any mechanical fastening means such as clamping rings acting on the beads of the hollow body, as well as any elastic air vessels to be disposed in the interior of the hollow body.

Furthermore, in my Patent No. 2,920,885, issued January 12, 1960, I have described annular, toroidal hollow bodies for air cushioning which possess reinforcing elements embedded in the material forming the hollow body in such a manner that they are disposed in radial direction to the body, i.e. that they are arranged in planes which are radial to the main central openings of the annular body. The method and means of sealing, according to the present invention, permit a much better performance of such radially disposed reinforcing elements in the hollow body by allowing a much better use of the increased deformability of these bodies due to the radial reinforcing elements than would be the case if the beads of these reinforced hollow bodies were clamped mechanically.

According to another important feature of my invention, the operational safety of the entire air suspension system is enhanced by providing elastically deformable sealing means between the beads of the hollow body and the seating surfaces of the vehicle parts, or the like bodies, to be cushioned against each other. These sealing means may either consist of sealing elements which are rigidly connected to the beads of the hollow body, or they may consist of detachably mounted sealing rings which are inserted between the aforesaid seating surfaces and the corresponding beads of the hollow body when mounting the hollow body.

The sealing means may thus comprise elastic layers rigidly connected to the beads of the hollow body whose diameter is so dimensioned that these layers are elastically deformed when mounting the hollow body in place. It is further possible to provide the beads of the hollow body with alternating ribs and grooves extending peripherally of the beads of the hollow body so that in the grooves between the ribs there are formed de-tension chambers of the kind well known in labyrinth sealing devices for their favorable effect upon the sealing gaseous media. In order to achieve this effect, however, the peripherally extending ribs on the beads of the hollow body must be so devised that grooves remain between them, even after the hollow body is mounted, i.e. in the mounted state, the ribs msut not be so compressed that they fill the grooves.

A further effective sealing means may be provided in the form of detachably arranged sealing rings consisting of a highly elastically deformable material such as, for instance, soft rubber. According to one preferred embodiment of the invention, these soft rubber sealing rings are of circular, or approximately circular cross section. The selection of a cross section of this type makes it possible to achieve the desired elastic deformability required for a satisfactory hermetic sealing. The deformation of these elastic, detachably arranged sealing rings is also effected under the influence of the internal air pressure acting upon the beads of the annular hollow body.

According to a further embodiment of the invention, these intermediate, endless sealing rings are provided of angular cross section.

The sealing method and means according to the invention are applicable to toroidal hollow bodies with or without reinforcing elements, although it is preferred to use them with bodies having radially disposed reinforcing elements embedded in the material of the hollow bodies. However, the beads of toroidal hollow bodies to be used for the purpose of this invention must contain bead cores of sufficient strength, i.e. of sufficiently large cross sectional area to prevent an increase in the diameter of the beads during the use of the toroidal bodies in air suspension systems due to the stress to which the toroidal hollow bodies will be subjected.

My invention will be more clearly understood from the following description when taken in conjunction with the accompanying drawings, wherein:

FIG. 1 is a schematic cross sectional view of an air suspension system according to the invention for vehicles destined for carrying heavy loads such as trucks, freight cars and the like;

FIG. 2 shows an embodiment of the sealing arrangement according to the invention in a partial cross sectional view;

FIG. 3 shows another embodiment of the sealing arrangement according to the invention;

FIG. 4 is a partial cross sectional view of a further embodiment of the sealing arrangement according to the invention;

FIG. 5 is a perspective view of a sealing means according to the invention as used in FIG. 4;

FIG. 6 is an embodiment of the sealing arrangement according to the invention similar to that shown in FIG. 4;

FIG. 7 is yet another embodiment of the sealing arrangement according to the invention.

Referring now to the drawings more in detail and particularly to FIG. 1, the toroidal hollow body 1, which consists substantially of rubber, is provided with beads 2 which contain bead cores 3. These cores may consist, for instance, of several windings of steel wire. The annular hollow body 1 has also embedded radially reinforcing elements 4 which are anchored at both ends on the bead cores 3. The reinforcing elements 4 are radially arranged, i.e. they are located in planes through the central axis of rotation of the hollow body 1.

The parts of the vehicle which are to be cushioned against each other are not shown in the drawings. They are each provided with a rigidly attached body support 15, 16 consisting of a circular disk 15a, 16a and a cylindrical flange 15b, 16b. Each of these supporting members bears on the outside of the flange portion an annular seating surface 17 substantially parallel to the plane in which the supporting member 15 or 16 extends, and a second, substantially cylindrical or conically tapered surface 18, both surfaces 17 and 18 forming an angle with each other. The beads 2 of the hollow body 1 are in contact with and supported by these seating surfaces 17 and 18.

The slope of surface 18 is such that an angle is formed with the central axis of rotation of the hollow body 1, which angle of inclination may vary between 2° and 10°, and is preferably approximaely 5°.

The diameter of the internal opening on each side of the toroidal body 1, the periphery of which opening is formed by the beads 2, is so dimensioned that due to the excess pressure in the pressure space 19, these beads 2 are pressed tightly against the surfaces 17 and 18 and thus hermetically seal the pressure space 19.

As shown in FIG. 2, the radially inwardly directed end surfaces 20 of the beads 2 are provided with a firmly adhering, elastically deformable layer 21, the thickness of which layer is so dimensioned that a certain elastic deformation of the layer is possible when the layer is pressed against the surface 18 under the effect of the internal pressure of the space 19. In this instance, the pull-resistant cores 3 prevent an increase in the diameter of the beads 2 under the effect of the internal pressure and over the somewhat tapered surface 18. An increase in the diameter of the bead cores would disadvantageously influence the sealing effect. Of course, the surface of the beads 2 facing the seating surface 17 may also be provided with an elastic layer similar to layer 21. The layer 21 may be fastened to the bead 2 by means of any known suitable adherent or by vulcanizing the layer thereunto.

According to the embodiment shown in FIG. 3, the sealing layer 21 is provided with a number of peripherally extending ribs 22 and intermediate grooves 23, whereby de-tension chambers are formed, remaining present after mounting the annular body 1, i.e. during the use of the hollow body 1 for air suspension.

In the embodiment shown in FIG. 4, a detachably mounted sealing ring 24 of substantially circular cross section, as shown in FIG. 5, is used as a sealing means. This sealing ring 24 is of particularly well deformable elastic material. This ring 24 is so inserted between either the supporting member 15 or the member 16 and the toroidal body 1 that it is deformed to adapt the position shown in FIG. 4.

According to a still further embodiment shown in FIG. 6, the sealing means interposed between the beads 2 and the surfaces 17 and 18 is a detachably endless sealing ring 25 of angular cross section. These sealing rings 25 cover substantially the entire, or at least the greater part of surfaces 17 and 18. Again it is possible to provide these angular sealing rings 25 with ribs and grooves, as shown in FIG. 3. The width of the seating surface 17 may be the same as that of the seating surface 18 or it may be substantially smaller. Finally, as shown in FIG. 7, it is possible to suppress the seating surface 17 entirely if the conically tapered surface 18 is sufficiently extended to guarantee the safe seating of the beads 2 thereon. In the latter case also, the portions 26 of the toroidal body 1 being directly adjacent the end surface 20 are capable of participating in the deformation of the hollow body due to a deflection between the suspended members.

Valve 27 which is, for instance, provided in the supporting member 16 serves for metering compressed air into the pressure space 19 defined by the interior of the toroidal body 1, the supporting member 16 forming the bottom, and the supporting member 15 forming the top surface thereof.

The material used for the intermediate seating means is a soft rubber of high elasticity which is substantially free from lasting deformation. In the case of elastically deformable layers such as layers 21, I prefer to use soft rubber having a shore hardness of 45 to 70; the material of the ribs 22 is preferably of a shore hardness between 60 and 80; and for the sealing rings 24, prefer to use material of a shore hardness between 35 and 60.

It will be understood that this invention is susceptible to modification and, accordingly, it is desired to comprehend such modifications within this invention as may fall within the scope of the appended claims.

It is mentioned that the hollow body for the suspension system according to the invention may have the shape of the pressure container shown in the U.S. Patent No. 2,208,540.

What is claimed is:

1. For new use in an air suspension system, the combination of a tubeless toroidal hollow body of elastic material having an upper and a lower central opening and a bead extending peripherally about each of said openings, bead cores inside said beads for counteracting expansion of said beads, and a top and bottom supporting member, said members being movable relative to each other, each of said supporting members having a circular flange entered into one of said central openings, said top and bottom supporting members thereby forming a pressure chamber with said toroidal hollow body, said circular flange having at least one seating surface being pressed against the bead of the corresponding central opening by excess pressure in said pressure chamber so as to hermetically seal the latter.

2. For new use in an air suspension system comprising the combination of a tubeless toroidal hollow body of elastic material having an upper and a lower central opening and a bead extending peripherally about each of said openings, bead cores inside said beads for counteracting expansion of said beads, and top and bottom supporting members which are movable relative to each other, each of said supporting members having a circular flange entered into one of said central openings, said top and bottom supporting members thereby forming a pressure chamber with said toroidal hollow body, the improvement of said circular flange having at least one seating surface being pressed against the bead of the corresponding central opening by excess pressure in said pressure chamber so as to hermetically seal the latter.

3. For new use in an air suspension system comprising the combination of a toroidal hollow body of elastic material having an upper and a lower central opening and a bead extending peripherally about each of said openings, bead cores inside said beads for counteracting expansion of said beads, and a top and bottom supporting member, each of said supporting members having a circular flange entered into one of said central openings, said top and bottom supporting members thereby forming a pressure chamber with said toroidal hollow body, the improvement of said circular flange having at least one seating surface being pressed against the bead of the corresponding central opening by excess pressure in said pressure chamber so as to hermetically seal the latter; and a compressible seating member attached to the bead and compressedly adhering to the flange.

4. The combination as claimed in claim 1, further comprising an elastically compressible sealing member disposed between said bead and said seating surface, and a plurality of alternating ribs and grooves on said sealing member peripherally about the face of the same in contact with said seating surface.

5. The combination as claimed in claim 1, further comprising an elastically compressible sealing member of substantially round cross section, detachably disposed between said bead and said seating surface.

6. The combination as claimed in claim 1, wherein there are two annular seating surfaces on each of said circular flanges, one of which seating surfaces is conically tapered toward the interior of said pressure chamber while the other seating surface extends substantially parallel with the central plane of said toroidal body.

7. The combination as claimed in claim 6, wherein the width of said conically tapered seating surface is substantially greater than the width of said other seating surface.

8. The combination as claimed in claim 6, further comprising an annular compressible sealing member of angular cross section pressed against said bead and compressedly adhering to said seating surfaces.

References Cited in the file of this patent

UNITED STATES PATENTS

| | | |
|---|---|---|
| 1,133,337 | Tinkham | Mar. 30, 1915 |
| 2,470,676 | Aldous | May 17, 1949 |
| 2,587,470 | Herzegh | Feb. 26, 1952 |
| 2,709,472 | Hofweber | May 31, 1955 |
| 2,756,048 | Pfeiffer et al. | July 24, 1956 |

FOREIGN PATENTS

| | | |
|---|---|---|
| 6,411 | France | Nov. 17, 1906 |
| 17,813 | Great Britain | July 28, 1914 |
| 686,145 | Great Britain | Jan. 21, 1953 |
| 69,919 | Denmark | Sept. 5, 1949 |